US006895992B2

(12) United States Patent
Yamaguchi et al.

(10) Patent No.: US 6,895,992 B2
(45) Date of Patent: May 24, 2005

(54) FUEL PUMP FOR INTER-CYLINDER DIRECT FUEL INJECTION APPARATUS

(75) Inventors: Shizuka Yamaguchi, Hitachinaka (JP); Noboru Baba, Hitachiohta (JP); Masaya Takahashi, Hitachi (JP); Katsuyoshi Terakado, Naka (JP); Arata Kagiyama, Naka (JP); Masayoshi Kotaki, Hitachinaka (JP); Shogo Sawada, Hitachinaka (JP); Kazuo Ojima, Hitachinaka (JP); Hiroyuki Yamada, Hitachinaka (JP); Hideki Machimura, Naka (JP); Yukio Takahashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 188 days.

(21) Appl. No.: 10/283,173

(22) Filed: Oct. 30, 2002

(65) Prior Publication Data

US 2004/0003713 A1 Jan. 8, 2004

(30) Foreign Application Priority Data

Jul. 5, 2002 (JP) ....................................... 2002-196653

(51) Int. Cl.[7] ................................................ B32B 15/20

(52) U.S. Cl. .................. 137/375; 137/565.01; 428/652; 428/680; 428/936; 417/470

(58) Field of Search .......................... 417/470; 137/375, 137/565.01; 428/652, 680, 936

(56) References Cited

U.S. PATENT DOCUMENTS 5,897,965 A * 4/1999 Itoh et al. ................... 428/652

FOREIGN PATENT DOCUMENTS

JP 7-48681 2/1995
WO WO02/055870 7/2002

* cited by examiner

*Primary Examiner*—A. Michael Chambers
(74) *Attorney, Agent, or Firm*—Crowell & Moring LLP

(57) ABSTRACT

Disclosed herein is a fuel pump for an inter-cylinder direct fuel injection apparatus, in which occurrence of corrosion and attrition caused by cavitation or erosion can be suppressed, their resistance against the environment can be improved, and an excellent lifetime can be achieved in the case of the use of an aluminum material even if the temperature reaches as high as 100° C. or higher and the pressure reaches as high as 7 to 12 MPa. In the fuel pump for an inter-cylinder direct fuel injection apparatus, made of aluminum or an aluminum alloy, a coating film plated with Ni—P or a Ni—P based material is formed by electroless plating.

4 Claims, 9 Drawing Sheets

| SAMPLE | | TEST TIME | |
|---|---|---|---|
| THICKNESS OF Ni-P | HEAT TREATMENT | 50min | 80min |
| 10 μm | 200°C × 1h |  |  |
| 15 μm | NOT TREATED |  | |
| | 200°C × 1h |  |  |

FUEL PUMP FOR INTER-CYLINDER DIRECT FUEL INJECTION APPARATUS

BACKGROUND OF THE INVENTION

The present invention relates to a fuel pump for use in an inter-cylinder direct fuel injection apparatus for an automobile.

There has been conventionally used an inter-cylinder direct fuel injection apparatus in a gasoline engine for an automobile in order to enhance fuel economy characteristics, reduce a harmful exhaust gas, and improve an operating responsiveness such as acceleration.

From the viewpoint of energy saving provided by the reduction of the weight of the automobile, a product is desired in which the reduction of the weight should be achieved by using an aluminum based material also in a fuel pump member in the inter-cylinder direct fuel injection apparatus.

Japanese Patent Laid-open No. 7-48681 discloses the technique by which a metallic coating film is formed on aluminum or an aluminum alloy by electroless plating, and thereafter, is subjected to electric plating.

However, since the electric plating also is used in addition to the electroless plating in the technique disclosed in Japanese Patent Application Laid-open No. 7-48681, no coating film may be formed in a region in which the electricity cannot flow very well when the technique is applied to an inter-cylinder direct fuel injection apparatus having numerous holes or narrow gaps as it is. Then, a base is exposed, thereby producing a problem of occurrence of damage such as corrosion.

SUMMARY OF THE INVENTION

As described above, an object of the present invention is to provide a fuel pump for an inter-cylinder direct fuel injection apparatus, which is made of an aluminum material, and therefore, is excellent in lifetime.

As means for achieving the above-described object, according to the present invention, a coating film plated with Ni—P or a Ni—P based material is formed on a fuel pump in an inter-cylinder direct fuel injection having a pump body made of aluminum or an aluminum alloy. Consequently, the aluminum or the aluminum alloy can suppress corrosion due to alcohol or the like contained in gasoline and attrition caused by cavitation and erosion even if the temperature reaches as high as 100° C. or higher and the pressure reaches as high as 7 to 12 MPa, thus achieving the fuel pump having an excellent and high reliability.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

First Embodiment

Figure 1:
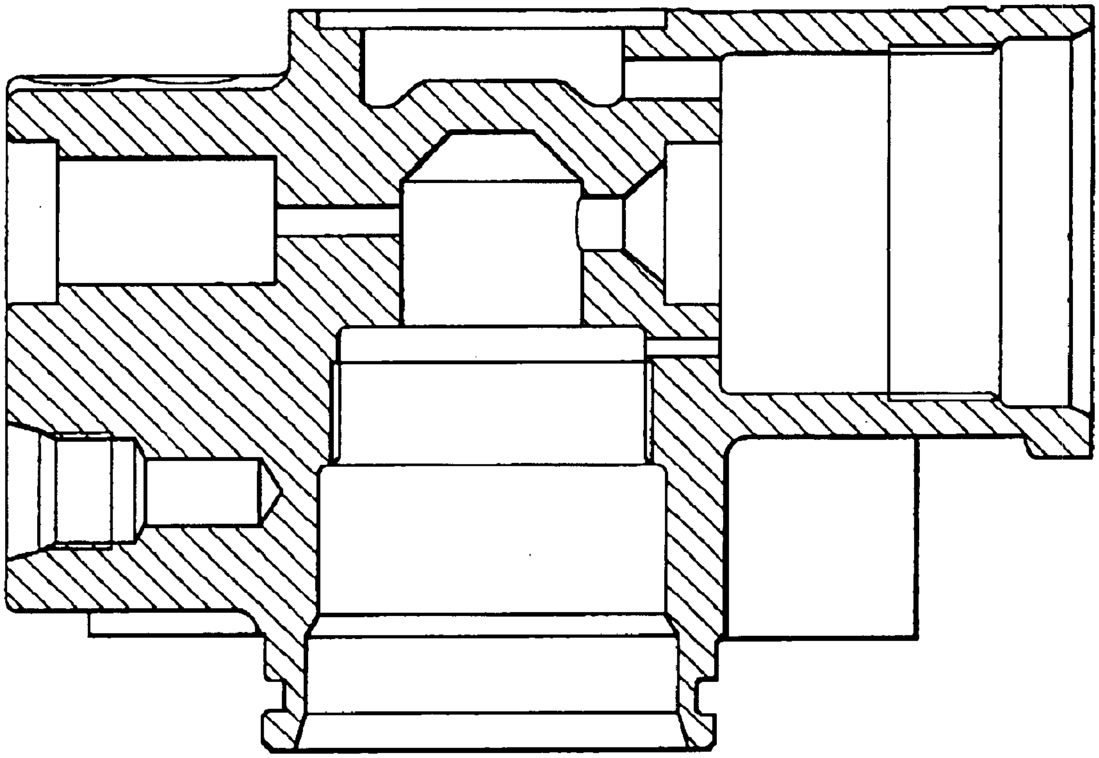
FIG. 1 is a cross-sectional view showing a pump body of a fuel pump in a first preferred embodiment according to the present invention.

Ni—P plating is applied to a radial plunger fuel pump (one cylinder type) in the present embodiment.

Before a description is given of one preferred embodiment according to the present invention, explanation will be first made on problems arising in a fuel pump in the case where aluminum or an aluminum alloy is used as a material of a fuel pump body.

(1) Problem of Corrosion of Aluminum

In the present embodiment, since aluminum to be used as the material of a fuel pump is stably present in the environment of dry air at a room temperature, an oxide coating film $Al_2O_3$ having a protecting property is formed at an outermost surface.

However, if alcohol, water, an acidic component or the like is mixed into gasoline, corrosion of the material will be promoted. For example, it is construed that the aluminum is corroded in the presence of alcohol.

For example, a specific explanation will be made below by way of ethanol as one kind of alcohols. Aluminum and ethanol react with each other as the following chemical formula:

$$2Al+6C_2H_5OH?2Al(OC_2H_5)_3+3H_2$$

Although $Al(OC_2H_5)_3$ is produced in the way, this compound is unstable, and therefore, it is instantly decomposed as the following chemical formulae:

$$2Al(OC_2H_5)_3+6H_2?2Al(OH)_3+6C_2H_6$$

$$2Al(OH)_3?Al_2O_3.H_2O+2H_2O$$

That is to say, a thin $Al_2O_3$ barrier layer formed by the above-described reaction is instantly damaged by ethanol in a high-temperature state, and therefore, the corrosion of an aluminum base member having no barrier layer proceeds, thereby causing attrition. In addition, such a reaction is accelerated as the temperature becomes higher. Specifically, the corrosion reaction with alcohol is accelerated in a component part in a fuel passage system to be exposed in a region in which the temperature is as high as 100° C. or higher without stopping. Additionally, the pressure reaches as high as 7 to 12 MPa in a pressurizing chamber in the fuel pump, whereby the reaction speed is accelerated without stopping.

(2) Problem of Attrition Caused by Cavitation

The cavitation is caused by bubbles generated by a difference in pressure inside of a pump. In other words, a flow rate under a pressure as high as 7 to 12 MPa or higher is generated in the pressurizing chamber inside of a fuel chamber; in contrast, a flow rate under a low pressure is generated at corners in a pump unit. Therefore, bubbles are produced, resulting in marked damage exerted on the pump. Namely, the cavitation becomes a very serious problem in the fuel passage in which the fuel passes under a high pressure. Furthermore, the degree of attrition caused by the cavitation is influenced also by the hardness of a base member. The attrition caused by the cavitation becomes conspicuous with respect to the aluminum material which is soft.

(3) Problem of Attrition Caused by Erosion

As described already, the pressure as high as 7 to 12 MPa or higher is generated in the pump unit (the pressurizing chamber) inside of the fuel chamber. Therefore, erosion in the fuel passage by a high-speed fluid becomes a serious problem, and thus, such an influence must be taken into consideration. In particular, the influence by the erosion becomes conspicuous at a portion formed into a complicated and narrow shape such as a joint portion of the fuel passage at which the flow of the fuel is varied inside of the fuel chamber.

The damage caused by the above-described problems (1) to (3), that is, due to the corrosion and the attrition caused by cavitation and erosion the operation of the fuel pump is possibly stopped. Each of the component parts made of the aluminum material in the fuel passage system for supplying the fuel requires durability in the environments in which it is brought into contact with the fuels added with various kinds of alcohols, the fuel added with water, the fuels added with acidic components, a deteriorated fuel and the like.

Next, descriptions will be given of a Ni—P plating treatment of a radial fuel pump and a method for fabricating a radial plunger fuel pump.

FIG. 1 shows the cross-sectional shape of a pump body made of an aluminum alloy. The pump body is provided with a fuel suction passage, a fuel discharge passage, a fuel passage hole, a fixing bolt hole for fixing the pump body to the engine and the like. Moreover, the pump body includes a suction damper, a solenoid for a discharge quantity control and a pump mechanism (consisting of, for example, a cylinder and a plunger) in order to function as a fuel pump.

It is first necessary to fabricate the pump body. Here, if all of the pump body is shaped by machining, the productivity becomes poor. Therefore, there is an aluminum die casting method which is excellent in productivity of a schematic shape (as cast) of the pump body. The aluminum die casting is a casting system for injecting a molten alloy (e.g., an aluminum alloy) into a die under a high pressure, and it is excellent in productivity. A fabricating process by the aluminum die casting involves in sequence processes for an aluminum alloy ingot, a dissolved material, a cast material, an as-cast material, a machine-finished material, and finally, a pump body. In this process, the as-cast material for the pump body is shaped in such a manner as to reduce a machining margin as possible. As the aluminum alloy in this case, there can be used, for example, a twelfth aluminum alloy die casting (JIS ADC 12). According to the kind of aluminum alloy, the pump body is subjected to machining after forging or only to machining, to be thus fabricated in a final shape.

Next, a coating film plated with Ni—P or a Ni—P based material is formed on the pump body, which has been fabricated in the above-described process.

The plated coating film in the present embodiment is made of the Ni—P or the Ni—P based material. Examples of the Ni—P based material include metals such as Co and W, inorganic compounds such as SiC, BN and PTFE, and an organic material such as B. The kind of Ni—P based material is not particularly restricted to the above-listed materials as long as it can be alloyed with or dispersed in the plated coating film.

It is desirable that a coating film plated with Ni—P or a Ni—P based material should be formed by an electroless method. In other words, although a fuel passage includes a portion having a complicated and narrow shape, a coating film is essentially required to be formed even at such a portion, and further, the thickness of the plated coating film need be as uniform as possible. A plating method by electric energy is undesirable because the plated coating film cannot be formed at the complicated and narrow portion in the fuel passage due to a non-uniform in electric field distribution attributable to a shape effect, or the plated coating film is liable to become non-uniform even if it can be formed.

Here, in the electroless Ni—P plating, when a negative ion of hypophosphite in a plating solution is brought into contact with a metal of the eighth group in the periodic table under a certain condition, the metal serves as a catalyst, thereby generating dehydrogenation decomposition. The produced hydrogen atom is adsorbed to the metallic surface of the catalyst, thereby forming a condensed layer, which is then activated. The condensed layer is brought into contact with a positive ion of nickel in the plating solution, so that nickel is reduced to metal, to be deposited on the metallic surface of the catalyst (i.e., a base member). Furthermore, the activated hydrogen atom on the metallic surface of the catalyst reacts with the negative ion of hypophosphite in the plating solution, and then, phosphor contained in the hypophosphite is reduced to be alloyed with nickel. This deposited nickel serves as the catalyst, and thus, the above-described nickel reducing plating reaction continuously proceeds. That is to say, the electroless Ni—P plating is featured in that the plating continuously proceeds owing to the self-catalysis of nickel. Consequently, the plated coating film can be uniformly formed if there is a clearance through which the plating solution can pass. Moreover, since the thickness of the plated coating film is proportional to a plating period of time, the thickness can be managed by controlling the period of time.

Additionally, in the process of forming the coating film plated with the Ni—P or the Ni—P based material, the plated coating film is essentially required to be uniformly formed over the entire surface of the pump body. Therefore, in the plating process, it is important that the entire surface of the pump body should be brought into contact with the plating solution, and that the plating solution should be circulated without any retention.

Figure 2A:
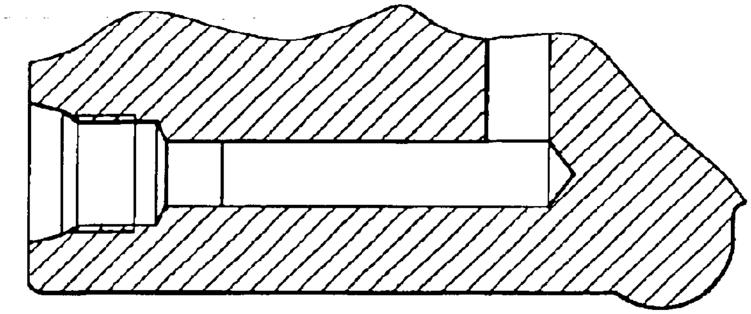
FIGS. 2A and 2B are partly cross-sectional views showing the pump body of the fuel pump in the first preferred embodiment according to the present invention.
Figure 2B:
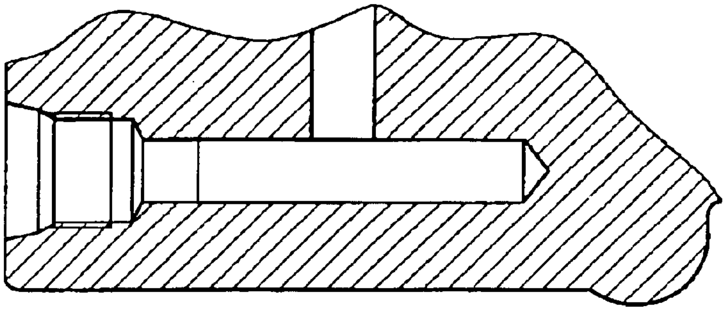

In order to bring the entire surface of the pump body into contact with the plating solution, it is effective that the pump body is disposed (or suspended) such that no air sump is generated inside of various kinds of holes formed in at least the fuel passage of the pump body, and that various kinds of holes formed as the fuel passage, which is an important portion in the pump body, are through holes. At this time, in spite of the through hole, the plating solution may be retained in the case of a so-called no-go hole (i.e., a hole at which another hole is bored in the vicinity of not a short portion of the passage but the center of the passage, as shown in FIG. 2B). In this case, it is very effective that the uniform plated coating film is formed by connecting the holes to each other in the vicinity of the short portion of each of the various kinds of holes, as shown in FIG. 2A, so as to prevent any retention of the plating solution.

The circulation of the plating solution over the entire surface of the pump body without any retention is essentially required to enable the deposition by the self-catalysis of the Ni—P or the Ni—P based material to continuously proceed. If the retention occurs, the deposition by the self-catalysis in the limited quantity of the plating solution comes to an end, and the deposition thereafter is stopped. Therefore, the thickness of the plated coating film cannot be increased. As a consequence, the thickness becomes non-uniform. In order to prevent the above-described inconvenience, the pump body is allowed to be moved in the plating solution, for example, vertically, laterally or rotationally so as to fluidize the plating solution as one method for circulating the plating solution over the entire surface of the pump body without any retention.

As described above, it is possible to achieve the contact with the plating solution over the entire surface of the pump body and prevent any retention of the plating solution, thus forming the uniform and excellent plated coating film with little deficiency over the entire surface of the pump body.

In the present embodiment, the aluminum alloy casting material JIS ADC 12 was used, a Ni—P plated coating film was formed in a thickness of 15 $\mu$m (a thickness distribution of ±2 $\mu$m) over the entire surface of a pump body 100. The concentration of P contained in the Ni—P plating solution was about 11% by weight.

FIGS. 3 to 6 illustrate examples of the surface structure of a fuel pump.

Figure 3:
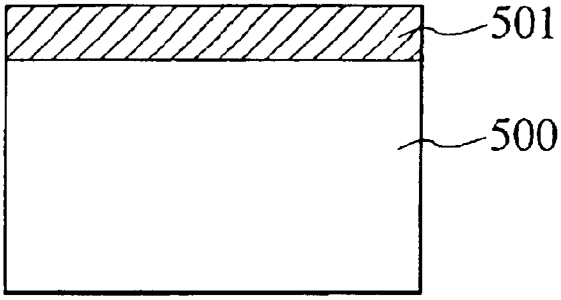
FIG. 3 is a view illustrating the configuration of a surface treatment layer in the first preferred embodiment according to the present invention.

FIG. 3 illustrates the surface structure in which a plated coating film 501 is formed on a base member 500 made of an aluminum alloy.

Figure 4:
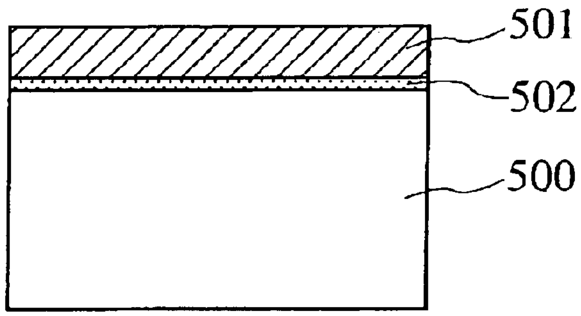
FIG. 4 is a view illustrating the configuration of another surface treatment layer in the first preferred embodiment according to the present invention.

FIG. 4 illustrates the surface structure in which a plated coating film 501 and an intermediate layer 502 are formed on a base member 500 made of an aluminum alloy.

Figure 5:
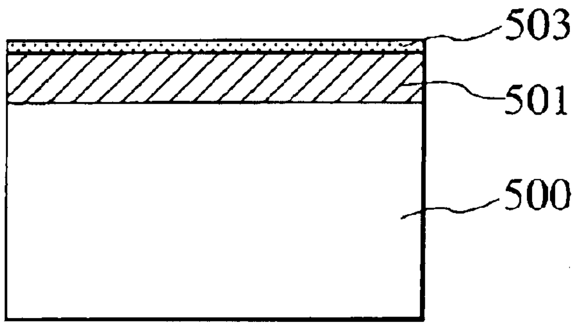
FIG. 5 is a view illustrating the configuration of a further surface treatment layer in the first preferred embodiment according to the present invention.

FIG. 5 illustrates the surface structure in which a plated coating film 501 and an outer layer 503 are formed on a base member 500 made of an aluminum alloy.

Figure 6:
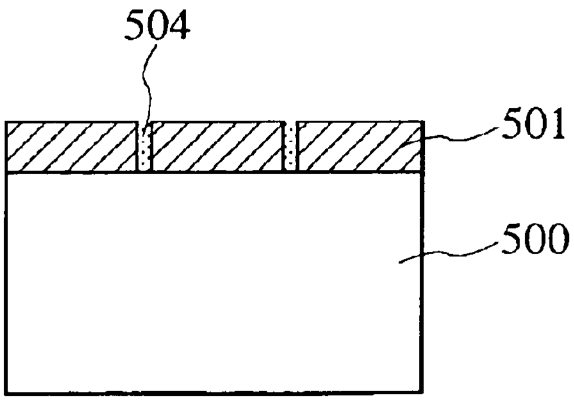
FIG. 6 is a view illustrating the configuration of a still further surface treatment layer in the first preferred embodiment according to the present invention.

FIG. 6 illustrates the surface structure in which a plated coating film 501 is formed on a base member 500 made of an aluminum alloy, and further, deficient portions such as pores in the plated coating film 501 are coated with a sealing layer 504.

The intermediate layer 502 has the function of enhancing the adhesion to the plated coating film 501 or improving corrosion resistance. The intermediate layer 502 for enhancing the adhesion is made of Ni. An oxide coating film or a chromate coating film is used in order to improve the corrosion resistance. It is desirable that a fine coating film formed in water at a high temperature under a high pressure should be used as the oxide coating film.

The outer layer 503 has the function of improving the corrosion resistance of the plated coating film 501. The material of the outer layer 503 is chromate.

The sealing layer 504 is adapted to seal the deficient portions of the plated coating film 501, and has the function of improving the corrosion resistance. The sealing layer 504 is formed of an oxide coating film or a chromate coating film. It is desirable that a fine coating film formed in water at a high temperature under a high pressure should be used as the oxide coating film.

Furthermore, the coating film formed by the electroless plating was subjected to heat treatment in the present embodiment, so as to increase the hardness of the coating film and enhance the adhesion between the base member and the coating film, thereby enhancing cavitation resistance. The details will be described later. The heat treatment of the plated coating film was performed at a temperature of 200° C. for 1.5 hours in the atmosphere. Consequently, the hardness of the Ni—P plated coating film was increased from 520 HV without any heat treatment to as high as 600 HV after the heat treatment.

Figure 7:
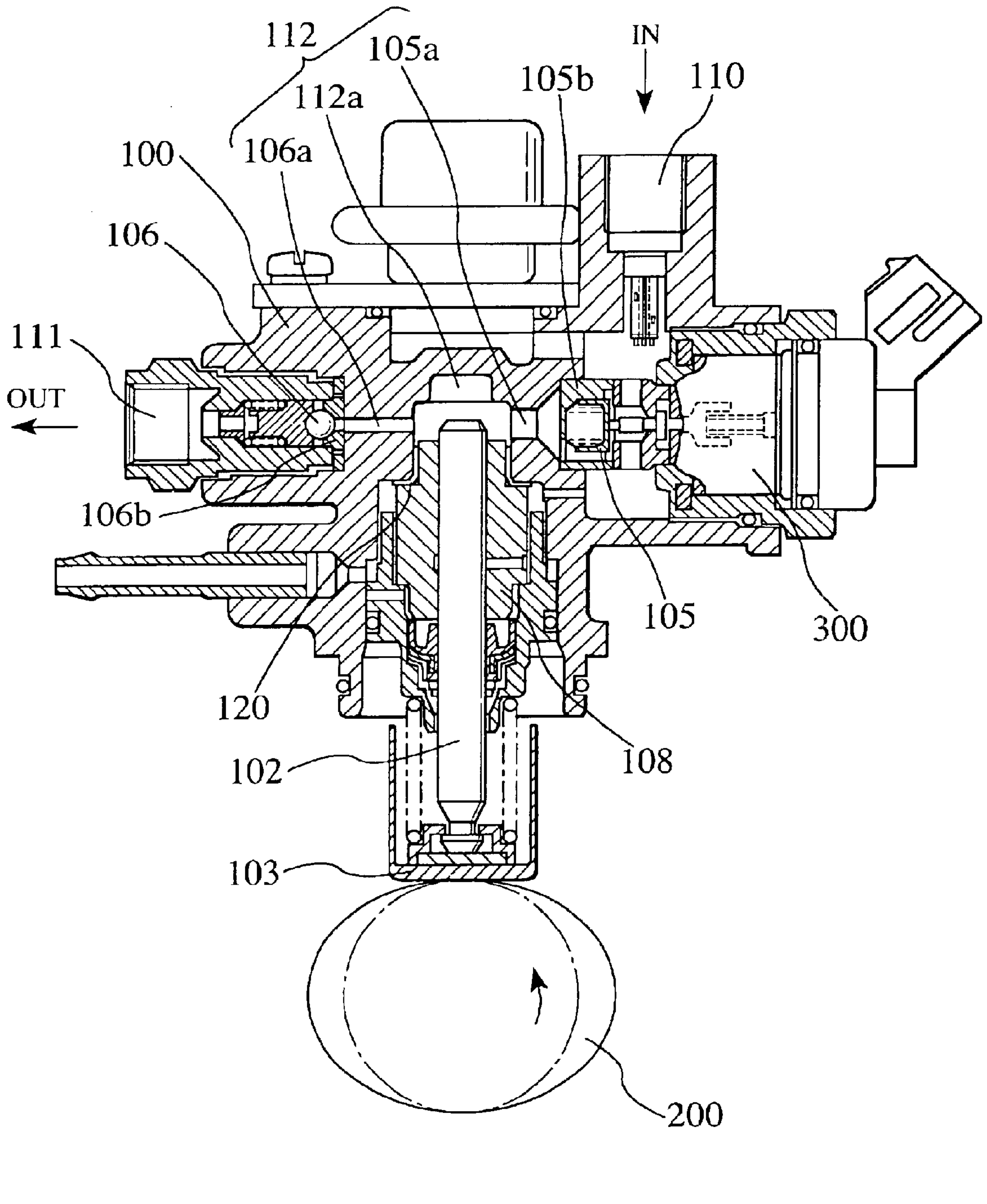
FIG. 7 is a partly cross-sectional view showing the fuel pump in the first preferred embodiment according to the present invention.

Subsequently, explanation will be made on a radial plunger fuel pump in the present embodiment, fabricated by the above-described fabricating method, in reference to FIG. 7, which is a cross-sectional view. Here, the Ni—P plating is uniformly applied to the pump body 100 made of the aluminum material in the above-described process. Incidentally, in the present embodiment, component parts in contact with fuel in the fuel pump were made of an aluminum material. Moreover, the pump body 100, a pressurizing chamber 112, a fuel suction passage 110, a fuel discharge passage 111 and the like are assumed to be used in contact with gasoline containing alcohol such as methyl alcohol or ethyl alcohol, various kinds of gasoline additives or deteriorated gasoline (of course, it is to be understood that the fuel may contain only gasoline).

In the pump body 100, there are formed, as the fuel passage, the fuel suction passage 110, a suction hole 105*a*, a pump chamber 112*a*, a discharge edge 106*a* and the fuel discharge passage 111. A suction valve 105 is interposed between the fuel suction passage 110 and the suction hole 105*a*; in the meantime, a discharge valve 106 is interposed between the fuel discharge passage 111 and the discharge edge 106*a*. Each of the suction valve 105 and the discharge valve 106 is a check valve for limiting the passing direction of the fuel. Here, the pressurizing chamber 112 is configured by including the pump chamber 112*a*, the suction hole 105*a* and the discharge edge 106*a*. That is to say, the pressurizing chamber 112 is formed in a region defined by the pump body 100, a plunger 102, the suction valve 105 and the discharge valve 106. The plunger 102 is configured in such a manner as to be brought into press-contact with a drive cam 200 via a lifter 103, so as to convert an oscillating motion of the drive cam 200 into a reciprocating motion, thereby changing the volume of the pressurizing chamber 112.

In the meantime, the pump body 100 is brought into press-contact with a suction valve holder 105*b* and a discharge valve holder 106*b*, respectively, and further, a cylinder 108 and the pump body 100 are brought into press-contact with each other via a protector 120. The protector 120 is useful for preventing the base member of the pump body or the like from being broken caused by occurrence of cavitation, described later. The use of the protector 120 may be selected depending upon the condition of the pump to be used. Although the protector 120 dare be provided in the present embodiment, no use of the protector 120 may be selected as long as the Ni—P plating is made thick and the corrosion resistance and cavitation resistance can be sufficiently achieved. In addition, since the Ni—P plating is applied to the pump body in the radial plunger fuel pump in the present embodiment, it is possible to suppress a direct contact between the soft aluminum base member and the protector 120 which may occur when the protector 120 (inclusive of a press-contact member such as the cylinder 108, hereinafter in the same manner) is brought into press-contact, and further, to suppress generation of powder of the soft base member when the protector 120 is brought into press-contact. Moreover, since the pump body is made of the aluminum material and the press-contact member is made of a member harder than the aluminum material (for example, JIS SUS 304) in the present embodiment, the press-contact member can be embedded in the pores so as to enhance the sealing property, and additionally, the Ni—P plated layer having a middle hardness is interposed between the aluminum material and the harder press-contact member, thereby preventing any excessive deformation of the aluminum material more than required during the press-contact. Here, it is to be understood that the protector 120 can be used also in other press-contact portions, thereby producing the same effect as that described above.

Next, a brief explanation will be made on the operation of the radial plunger fuel pump in the present embodiment.

The fuel, i.e., the gasoline is supplied via the suction valve 105, and then, is introduced into the pressurizing chamber 112. Here, the operation of the suction valve 105 depends upon that of a solenoid 300. Namely, when the solenoid 300 is not operated (not energized), an energizing force is applied in a direction in which the suction valve 105 is opened; in contrast, when the solenoid 300 is operated (energized), the suction valve 105 serves as a free valve which is opened or closed in synchronism with the reciprocating motion of the plunger 102. When the suction valve 105 is closed during a compressing process of the plunger 102, the inner pressure inside of the pressurizing chamber 112 is increased to thus automatically open the discharge valve 106, so that the fuel is press-fed to the fuel discharge passage.

Figure 8:
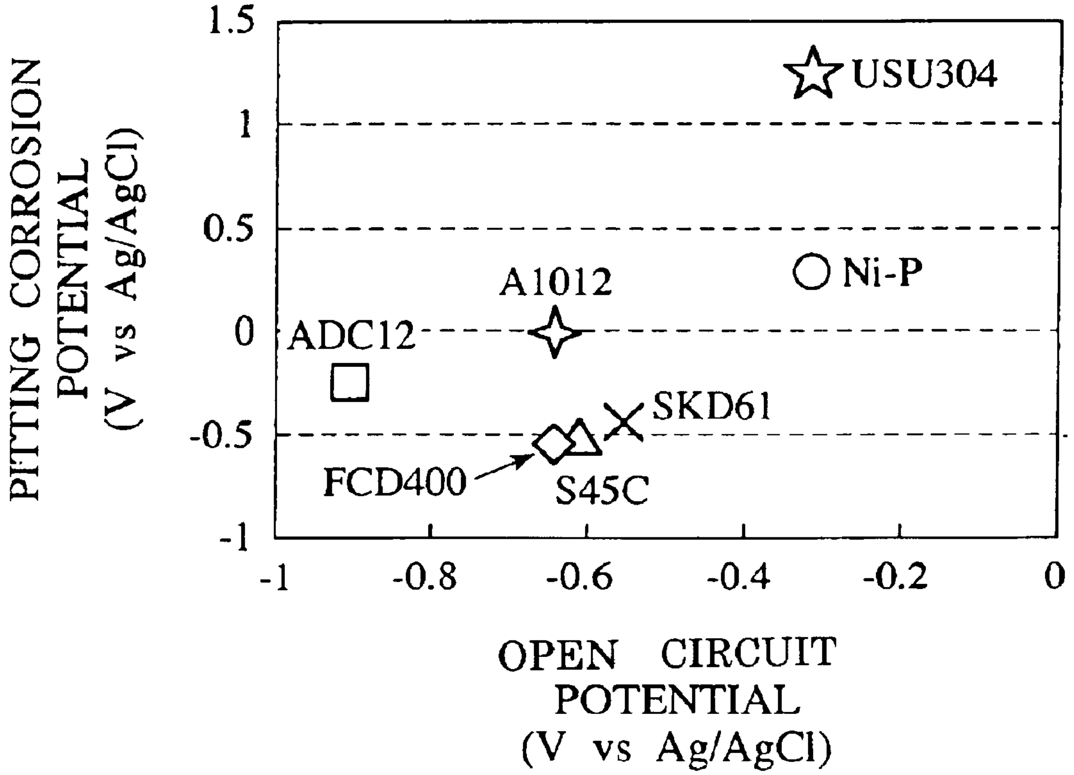
FIG. 8 is a graph illustrating the corrosion of each of aluminum materials plated with various materials and Ni—P.

FIG. 8 illustrates the corrosion resistance of various kinds of materials and the aluminum material plated with Ni—P, which is one surface treatment according to the present invention. A solution containing 13.5% by volume of ethyl alcohol in water and having an acidic ion concentration of 0.13 mg KOH/g in the total acid value was used in the environment of a corrosion test. FIG. 8 is a graph illustrating a open circuit potential and a pitting corrosion potential in the solution, wherein the corrosion resistance is more excellent as both of the open circuit potential and the pitting corrosion potential are higher. A value of an JIS SUS 304 stainless steel to be generally used as a material excellent in corrosion resistance is plotted in a region in which both of the open circuit potential and the pitting corrosion potential are high, and as a result, it is found that the JIS SUS 304 stainless steel is excellent in corrosion resistance. In contrast, a value of an aluminum alloy ductile material JIS A 1012 excellent in corrosion resistance is plotted in a region in which both of the open circuit potential and the pitting corrosion potential are lower, and as a result, it is revealed that the aluminum alloy flatting material JIS A 1012 is poor in corrosion resistance. In addition, a value of an aluminum alloy casting material JIS ADC 12 is plotted in a region in which both of the open circuit potential and the pitting corrosion potential are much lower, and as a result, it is found that the aluminum alloy casting material JIS ADC 12 is poorer in corrosion resistance. Values of an alloy tool steel JIS SKD 11 as an iron-based material, a spheroidal graphite cast iron JIS FCD 400 and a carbon steel JIS S45C are plotted in a region in which both of the open circuit potential and the pitting corrosion potential are low, wherein the corrosion resistance is slightly better since the open circuit potential is higher than that of the aluminum alloy casting material JIS ADC 12. This result revealed that the aluminum alloy casting material JIS ADC 12 was one of the materials poor in corrosion resistance. However, a material prepared by plating the aluminum alloy casting material JIS ADC 12 with Ni—P was remarkably higher in open circuit potential and pitting corrosion potential than the materials except for SUS, and therefore, was excellent in corrosion resistance. Consequently, the material prepared by plating the aluminum alloy casting material JIS ADC 12 with Ni—P has great advantages from the viewpoints of a light weight and easy machining, and thus, it is appreciated to be a very useful material, although it is slightly poorer in corrosion resistance than JIS SUS 304.

Figure 9:
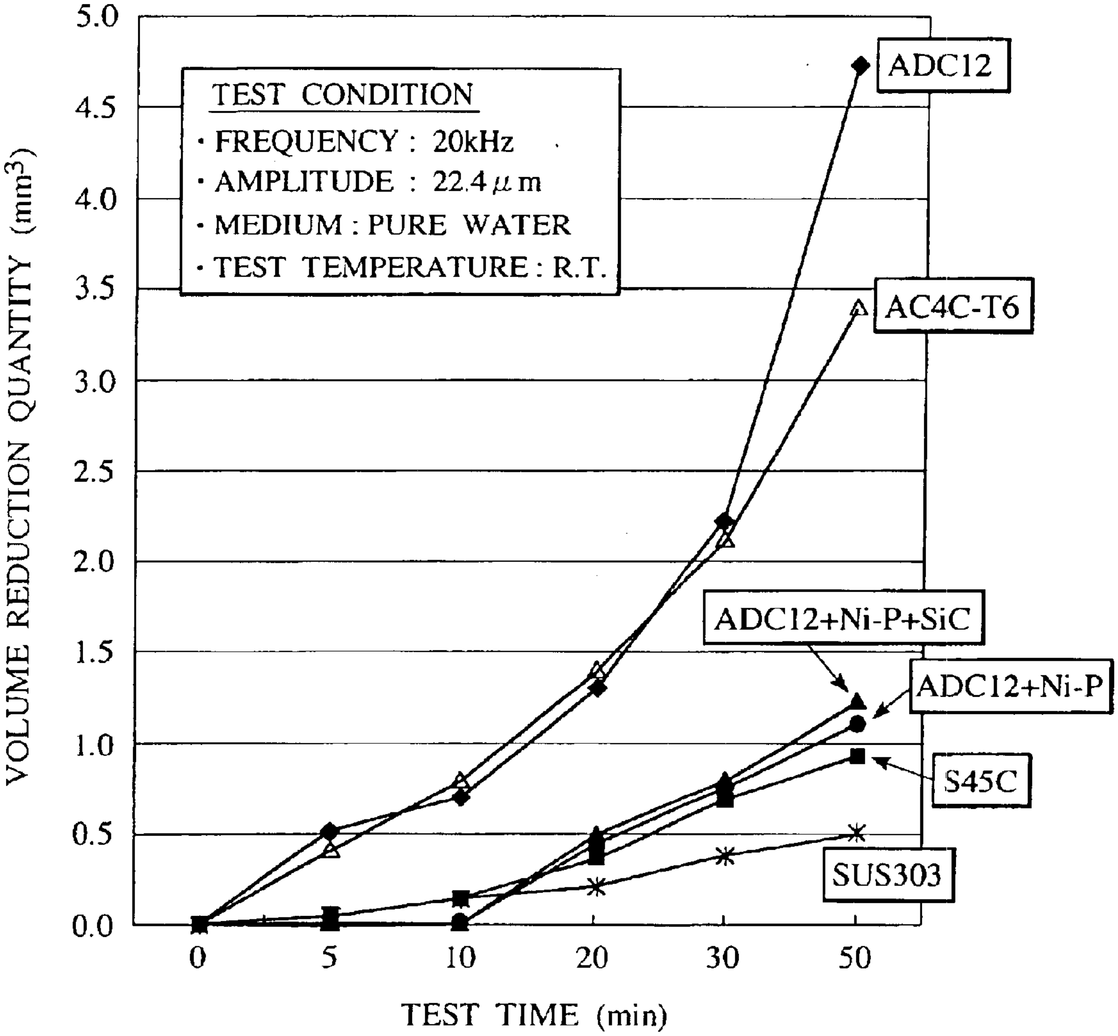
FIG. 9 is a graph illustrating a volume reduction quantity caused by cavitation attrition of each of the various materials.

Subsequently, the cavitation resistance was studied. FIG. 9 is a graph illustrating a volume reduction quantity due to cavitation attrition of various kinds of materials by a magnetostrictive vibration destructive testing device.

The measurement by the magnetostrictive vibration destructive testing device was achieved by comparing the attrition degrees of various kinds of materials caused by the cavitation in pure water at a frequency of 20 kHz, an amplitude of 22.4 $\mu$m and a temperature of 20° C. FIG. 9 shows the result that the volume reduction quantity is great with respect to soft aluminum based materials (see JIS ADC 12 and the like) while the volume reduction quantity is small with respect to hard iron steel, cast iron and stainless steel. However, if JIS ADC 12 is plated with Ni—P or Ni—P—SiC, the volume reduction quantity of JIS ADC 12 becomes as small as those of the iron steel and cast iron (see "JIS ADC 12+Ni—P" and the like). From this result, in order to improve the cavitation resistance of the aluminum based material by the surface treatment, it is found that plating with a Ni—P based material is excellent in forming a surface treatment coating film. Also in this case, since the aluminum material is used in the preferred embodiment according to the present invention, it is construed that a greater advantage can be obtained from the viewpoints of the light weight and easy machining in comparison with the other base members in the same manner as described above. Incidentally, it is necessary to take the influence of the hardness or thickness of the coating film into consideration with respect to the cavitation resistance.

Figure 10:
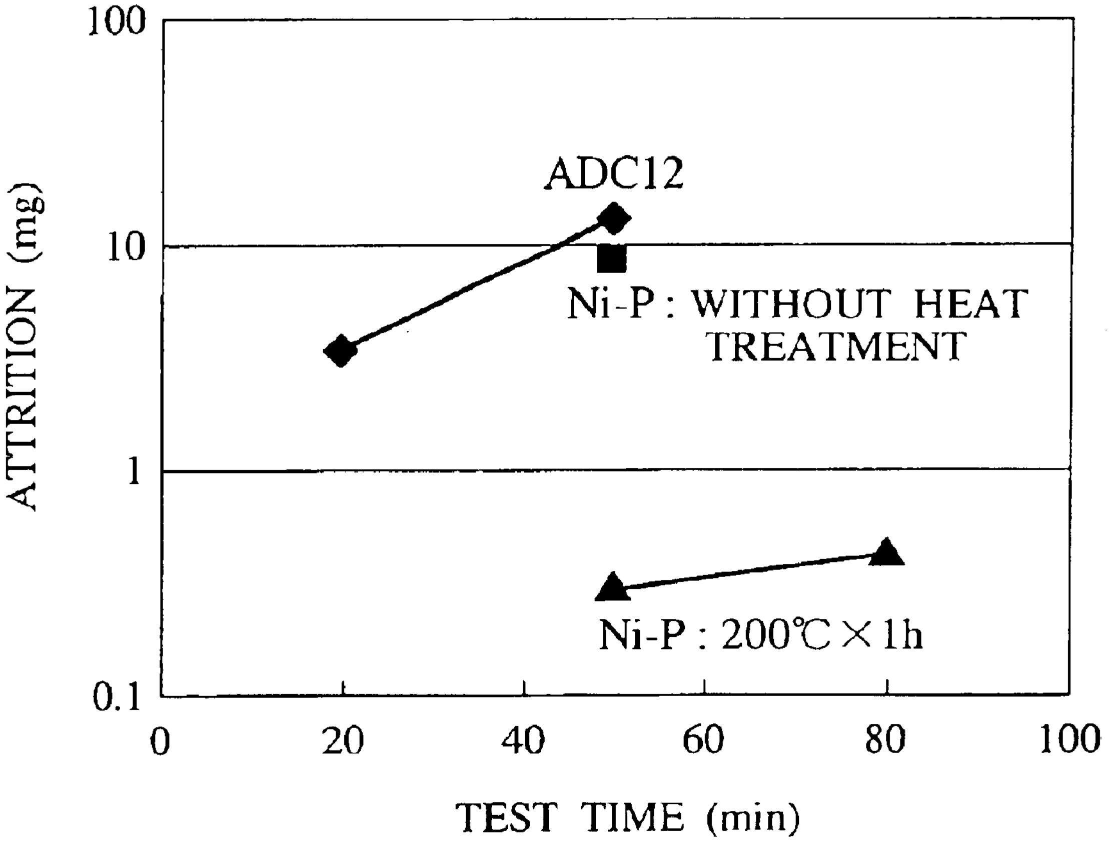
FIG. 10 is a graph illustrating the influence of heat treatment on the cavitation attrition.
Figure 11:
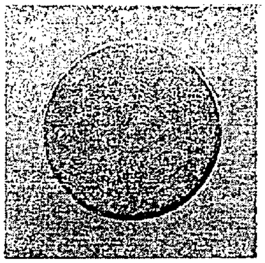
FIG. 11 is a diagram photographically illustrating the influence of heat treatment on the cavitation attrition.
Figure 11:
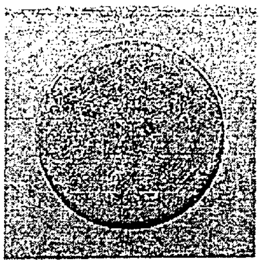
Figure 11:
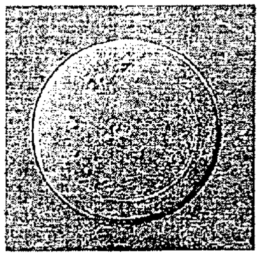
Figure 11:
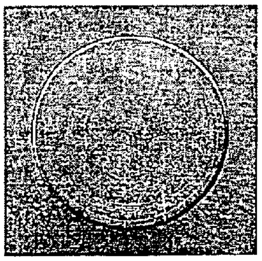
Figure 11:
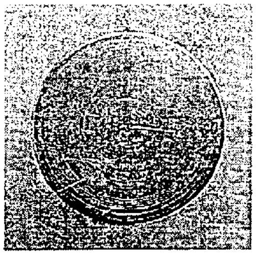

FIG. 10 is a graph illustrating the influence by the heat treatment using the Ni—P plated coating film on the cavitation attrition by the magnetostrictive vibration destructive testing device. The Ni—P plated coating film becomes harder by the heat treatment. That is to say, the hardness of the Ni—P plated coating film is about 500 HV only by plating treatment; in contrast, it becomes greater as the temperature of the heat treatment is increased, and thus, about 1000 HV at about 400° C. In addition, the Ni—P plated layer is subjected to the heat treatment, so that the adhesion between the aluminum material and the Ni—P plated layer can be enhanced, thereby suppressing the attrition caused by the cavitation. From FIG. 10, the attrition caused by the cavitation is less in the coating film subjected also to the heat treatment at 200° C. than in the coating film subjected only to the plating treatment because of the effects such as the increase in hardness and the enhancement of the adhesion. Furthermore, FIG. 11 photographically illustrates the test results of the influence of the Ni—P plating on the cavitation, corresponding to FIGS. 9 and 10. As is obvious from FIG. 11, samples subjected to the heat treatment at 200° C. for 1 hour could not show any attrition caused by the cavitation even if 50 minutes and 80 minutes elapsed. In contrast, a sample subjected to no heat treatment showed the attrition caused by the cavitation after a lapse of a test time of no more than 50 minutes. Namely, FIG. 11 shows that the hardness and adhesion of the plated coating film are enhanced owing to the heat treatment, so that the cavitation resistance can be remarkably improved. As a result, it is effective to subject the Ni—P plated coating film to the heat treatment in order to enhance the cavitation resistance of the Ni—P plated coating film. However, if deformation of the fuel pump due to the heat treatment is taken into consideration, the heat treatment need be performed at a low temperature. Moreover, the higher hardness is desired in view of the cavitation resistance. However, if the heating temperature is increased in order to increase the hardness of the plated coating film, the plated coating film is crystallized (at a crystallization temperature of about 220° C.), thereby generating a granular boundary of crystals. Due to such a granular field, the fuel containing alcohol corrodes the aluminum base member, thereby possibly deteriorating the corrosion resistance by contraries. Thus, it is effective that the temperature of the heat treatment cannot extremely exceed the crystallization temperature of the Ni—P plated coating film, which is kept in an amorphous state.

From the viewpoint of the balance between the corrosion and the cavitation which are taken into consideration, as described above, it is desirable that the heat treatment should be performed at a temperature of 300° C. or lower (about 800 HV). Additionally, it is effective that the amorphous state is kept by performing the heat treatment at a temperature of 220° C. or lower (about 650 HV).

Here, in the case where the thickness of the plated coating film is 10 μm or less, the plated coating film may be possibly peeled off by the corrosion, the cavitation or the like, and consequently, the base member may be possibly exposed and corroded before the fuel pump approaches the end of its lifetime. In contrast, in the case where the thickness of the plated coating film is 50 μm or more, a difference in dimension between a screw and a screw hole cannot be negligible, although the thickness is effective from the viewpoints of the corrosion resistance, the cavitation resistance and the fitting of the screw into the screw hole, thereby making it difficult to fix the press-contact component parts. In consideration of the above facts, in the case where the uniform plated layer is formed by the electroless plating, the thickness of the plated coating film is desirable to be about 25 μm. The reasons why the Ni—P plated coating film is effective for fitting of the screw into the screw hole are that: the surface of the aluminum material becomes smooth by the Ni—P plating even if the surface is rough; the shape of the screw hole becomes more stable in comparison with the fitting of the screw into the screw hole formed at the aluminum material subjected to no surface treatment when the hardness of the Ni—P plated layer becomes high; and the generation of aluminum powder caused by the friction between aluminum and the press-contact member in screwing can be suppressed. As long as the above-described results are taken into consideration, the electroless plating treatment, in which both of the screw hole portion and the fuel passage can be subjected to the plating treatment at one time, is very effective.

Additionally, an actual machine endurance test of the fuel pump in the present embodiment also was performed. Gasoline added with 22% of ethanol was used as the fuel, and the test was performed at an engine speed of 3,500 r/min and a discharge pressure of 12 MPa. As a result, the pump could be actuated without any abnormality, and further, a gasoline discharge flow rate exhibited a stable value. After the test, when the pump was disassembled and each of the component parts inside of the fuel chamber was inspected, there were found no generation of corrosion at any component part, no attrition caused by the corrosion and the occurrence of the attrition in the fuel passage caused by the cavitation, and therefore, the normal state could be kept. In contrast, without any treatment, there were found the corrosion by aluminum and ethanol and the attrition caused by the cavitation and erosion, as described already.

As described above, since the coating film plated with the Ni—P or the Ni—P based material is formed in the fuel passage in the fuel pump in the present embodiment, the occurrence of the corrosion and the attrition caused by the cavitation and erosion can be suppressed, and therefore, their resistance against the environment could be improved. In this manner, the fuel pump made of aluminum or the aluminum alloy can be obtained for the first time, thereby achieving the fuel pump having the complicated shape with ease. It is to be understood that the effects in the present embodiment can be produced with either aluminum singly or the aluminum alloy as long as the material is aluminum.

Second Embodiment

A second embodiment is the same as the first embodiment except for points described below. The second embodiment will be explained in reference to FIG. 12.

Figure 12:
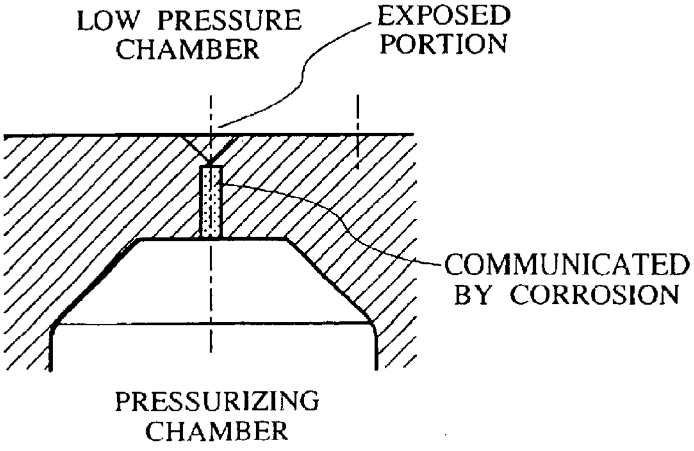
FIG. 12 is a partly cross-sectional view showing a fuel pump in a second preferred embodiment according to the present invention.

FIG. 12 shows a radial plunger fuel pump having, at a part of a low pressure chamber of a pump body partitioning a pressurizing chamber and the low pressure chamber, a portion at which an aluminum material is exposed by peeling off plating or no plating treatment dare be performed. In this way, the corrosion resistance of the portion, at which the aluminum material is exposed, is made lowest among other portions, that is, the low pressure chamber and the pressurizing chamber can communicate with each other prior to other corroded portions, thereby preventing other serious deficiencies caused by corrosion although there may occur a deficient increase in pressure in the relatively low-risk situation.

Third Embodiment

Figure 13:
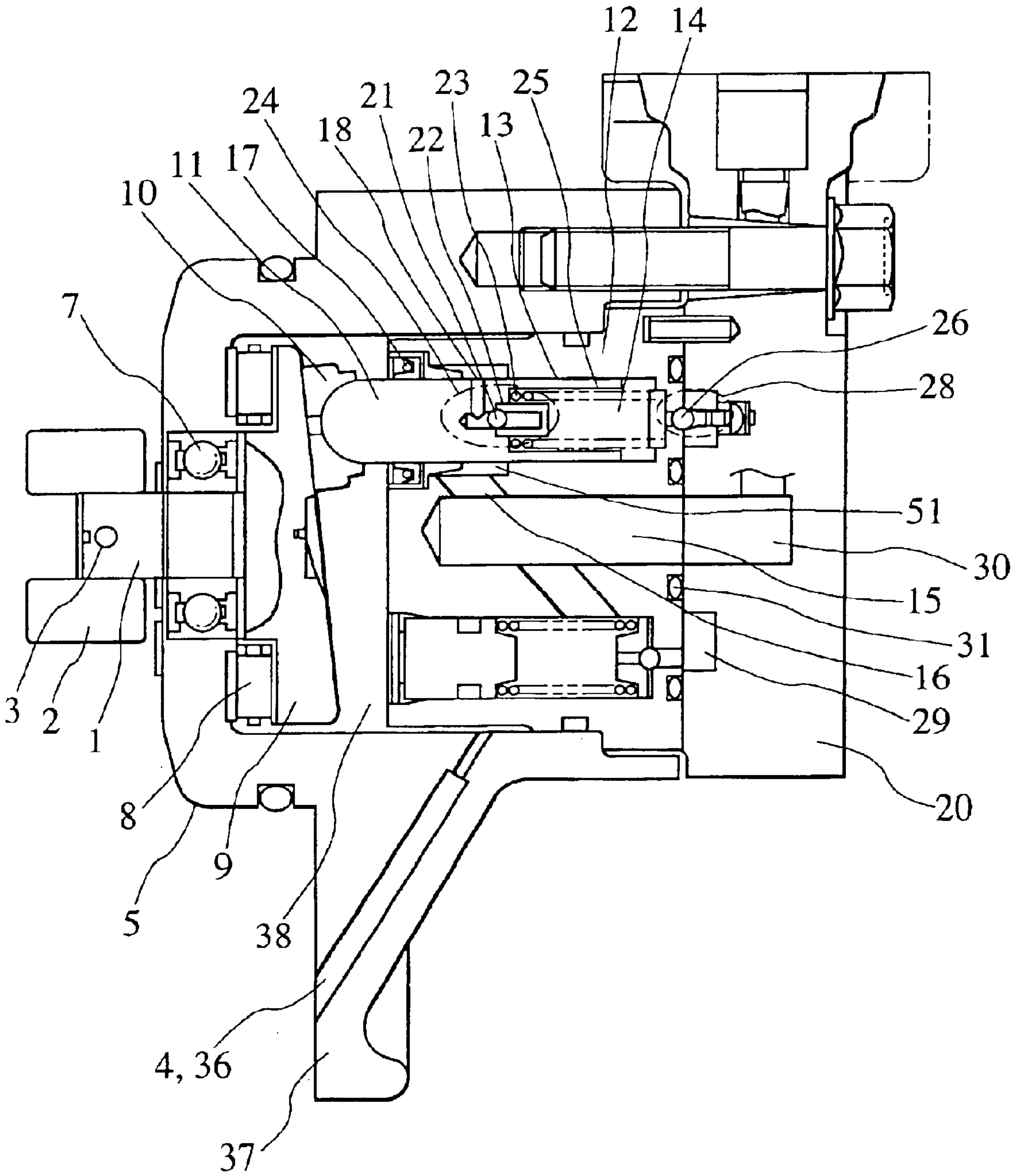
FIG. 13 is a cross-sectional view showing a fuel pump in a third preferred embodiment according to the present invention.

FIG. 13 is a cross-sectional view showing a swash plate type axial plunger fuel pump (a three-cylinder type).

The swash plate type axial plunger fuel pump comprises a shaft 1 for transmitting drive force to the inside of a housing from the outside; a swash plate 9 for converting a rotating motion into an oscillating motion via the shaft; a plunger 11 for converting a rotating motion of the swash plate 9 into a reciprocating motion; and a cylinder bore 13 for sucking and discharging fuel in combination with the plunger 11.

As shown in FIG. 13, the shaft 1 is integrated with the swash plate 9 which extends in a radial direction and is formed at the end surface thereof into a slant plane. A slipper 10 is brought into contact with the swash plate 9. At the outer periphery of the slipper 10 on the side of the swash plate 9, there is provided a taper for assisting the formation of an oil film between the swash plate 9 and the slipper 10. The slipper 10 is formed into a spherical shape on the other side thereof, and thus, is supported by the spherical surface formed at the plunger 11 which slides inside of the cylinder bore 13. The oscillating motion generated when the swash plate 9 is rotated is converted into the reciprocating motion of the plunger 11.

With this pump structure, a pump chamber 14 is defined inside of a cylinder 12 by the plurality of cylinder bores 13 and plungers 11. There is provided a suction space 15 communicating with each of the plungers 11 at the center portion of the cylinder 12, so as to supply the fuel to the pump chamber 14. In order to introduce the fuel into the suction space 15, a fuel pipeline outside of the pump is fixed to a rear body 20. A suction chamber 30 at the center portion of the rear body 20 is connected to the suction space 15 formed in the cylinder 12 through a suction passage inside of the rear body 20.

The plunger 11 incorporates therein a suction valve 24 (i.e., a check valve) for sucking the fuel, a ball 21, a spring 22 and a stopper 23 for supporting the spring 22. A plunger spring 25 is inserted for the purpose of pressing the plunger 11 against the swash plate 9 all the time so as to allow the plunger 11 together with the slipper 10 to follow the swash plate 9.

A communication path A 16 to the suction valve 24 disposed inside of the plunger 11 is formed as a communication path to a countersink 51 and the suction space 15 disposed in the cylinder bore 13. The countersink 51 has a diameter greater than the cylinder bore 13, and is formed down to such a depth as to achieve the communication between an introducing hole 19 and the countersink 51 also when the volume of the pump chamber 14 is sufficiently reduced (when the position of the plunger is located at a top dead center) in such a manner that the fuel can be introduced into the plunger 11 all the time.

In the swash plate type axial plunger fuel pump shown in FIG. 13, an aluminum material is used in the rear body 20 as a component part which is brought into contact with the fuel. Corrosion resistance is required for the rear body 20 in the case where corrosion may occur caused by the fuel of gasoline added with methyl alcohol or ethyl alcohol, various kinds of gasoline additives or deteriorated gasoline. Other component parts, for example, the cylinder 12 and the cylinder bore 13 are made of a stainless steel and an alloy tool steel, respectively.

The rear body 20 is provided with a fuel passage consisting of a discharge valve 28, a discharge chamber 29, the suction chamber 30 and the like. Furthermore, the rear body 20 is tightened to a body 5, and air-tightness thereof is secured by an O-ring 31.

Then, in the present embodiment, the plated coating film having the structure shown in FIG. 1 was formed over the entire rear body 20 in the fuel pump. The Ni—P plated coating film had a concentration of P of about 11% by weight, a thickness of 15 $\mu$m and a thickness distribution of ±2 $\mu$m. The rear body 20 was subjected to heat treatment at a temperature of 250° C. for 1 hour in the atmosphere. Consequently, the hardness of the Ni—P plated coating film was increased from about 520 HV without any heat treatment to 657 HV after the heat treatment.

Subsequently, an actual machine endurance test of the fuel pump in the present embodiment was performed. Gasoline added with 15% of ethanol was used as the fuel, and the test was performed at an engine speed of 3,500 r/min and a discharge pressure of 12 MPa. As a result, the pump could be actuated without any abnormality, and further, a gasoline discharge flow rate exhibited a stable value. After the test, when the pump was disassembled and each of the component parts inside of the fuel chamber was inspected, there were found neither generation of corrosion at any component part nor occurrence of the attrition caused by the corrosion, cavitation or erosion in the fuel passage, and therefore, the normal state could be kept. In contrast, without any treatment, there were found the attrition caused by the corrosion by aluminum and ethanol over the entire periphery of the portion in contact with the O-ring and in the fuel passage in the discharge chamber at a portion sealed with the O-ring in the rear body.

As described above, since the coating film plated with the Ni—P or the Ni—P based material is formed in the fuel passage in the fuel pump in the present embodiment, the occurrence of the corrosion and the attrition caused by the cavitation and erosion can be suppressed, and therefore, their resistance against the environment could be improved. In this manner, the fuel pump made of aluminum or the aluminum alloy can be obtained for the first time, thereby achieving the fuel pump having the complicated shape with ease.

As described above, according to the present invention, it is possible to provide the fuel pump for the inter-cylinder direct fuel injection apparatus, having the excellent lifetime by the use of the aluminum material.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A fuel pump for an inter-cylinder direct fuel injection apparatus comprising:

a pump body made of aluminum or an aluminum alloy;

a seal made of a coating film plated with Ni—P or a Ni—P based material, which is applied to the aluminum or the aluminum alloy;

a fuel passage of the pump body provided with holes, said fuel passage accommodating a flow of gasoline added with or without alcohol; and a press-fitting member; wherein the coating film plated with Ni—P or a Ni—P based material is formed in a thickness of 10 $\mu$m or more and 50 $\mu$m or less and is 500 HV or more, and each of the holes is continuous to the other holes in the vicinity of a short portion.

2. A fuel pump for an inter-cylinder direct fuel injection apparatus as claimed in claim 1, wherein an oxide coating film or a chromate coating film is further formed between the aluminum or the aluminum alloy and the coating film plated with the Ni—P or the Ni—P based material.

3. A fuel pump for an inter-cylinder direct fuel injection apparatus as claimed in claim 1, wherein;

the fuel passage includes a pressurizing chamber and a low pressure chamber, the pressurizing chamber and the low pressure chamber being partitioned from each other via the aluminum or the aluminum alloy; and there is provided a portion at which the aluminum or the aluminum alloy is exposed at a part, on the side of the low pressure chamber, of the aluminum or the aluminum alloy for partitioning the pressurizing chamber and the low pressure chamber from each other.

4. A fuel pump for an inter-cylinder direct fuel injection apparatus as claimed in claim 1, wherein the coating film plated with the Ni—P or the Ni—P based material is amorphous.

* * * * *